US006582764B2

(12) United States Patent
Fuller et al.

(10) Patent No.: US 6,582,764 B2
(45) Date of Patent: Jun. 24, 2003

(54) HYBRID INORGANIC/ORGANIC COLOR EFFECT MATERIALS AND PRODUCTION THEREOF

(75) Inventors: Daniel S. Fuller, Beacon, NY (US); Curtis J. Zimmermann, Cold Spring, NY (US)

(73) Assignee: Engelhard Corporation, NJ (US)

( * ) Notice: Subject to any disclaimer, the term of this patent is extended or adjusted under 35 U.S.C. 154(b) by 0 days.

(21) Appl. No.: 09/973,632

(22) Filed: Oct. 9, 2001

(65) Prior Publication Data

US 2003/0072961 A1 Apr. 17, 2003

(51) Int. Cl.[7] ................................................. B05D 7/00
(52) U.S. Cl. ........................ 427/217; 427/212; 427/220; 427/407.1
(58) Field of Search ................. 427/212, 216, 427/217, 214, 215, 220, 221, 402, 404, 407.1, 162

(56) References Cited

U.S. PATENT DOCUMENTS

| 3,438,796 A | 4/1969 | Hanke .......................... 106/291 |
| 3,767,443 A | 10/1973 | Clark et al. |
| 4,434,010 A | 2/1984 | Ash .............................. 106/291 |
| 5,030,445 A | 7/1991 | Hashimoto et al. ............. 424/59 |
| 5,059,245 A | 10/1991 | Phillips et al. .................. 106/22 |
| 5,135,812 A | 8/1992 | Phillips et al. ................. 428/403 |
| 5,171,363 A | 12/1992 | Phillips et al. .................. 106/22 |
| 5,279,657 A | 1/1994 | Phillips et al. .................. 106/22 |
| 5,281,480 A | 1/1994 | Phillips et al. ................. 428/412 |
| 5,624,486 A | 4/1997 | Schmid et al. ................. 106/404 |
| 5,648,165 A | 7/1997 | Phillips et al. ................. 428/346 |
| 5,766,335 A | 6/1998 | Bujard et al. .................. 106/404 |
| 5,766,738 A | 6/1998 | Phillips et al. ................. 428/200 |
| 5,958,125 A | 9/1999 | Schmid et al. ................. 106/417 |
| 6,013,370 A | 1/2000 | Coutler et al. ................. 428/403 |
| 6,136,083 A | 10/2000 | Schmidt et al. ................ 106/403 |
| 6,150,022 A | 11/2000 | Coutler et al. ................. 428/403 |
| 6,157,489 A | 12/2000 | Bradley, Jr. et al. ........... 359/584 |
| 6,325,847 B1 * | 12/2001 | Christie et al. ................ 106/403 |
| 6,440,208 B1 | 8/2002 | Christie et al. |

FOREIGN PATENT DOCUMENTS

| EP | 0 351 932 | 2/1989 |
| EP | 0313281 | 4/1989 |
| EP | 0 341 010 | 5/1989 |
| EP | 0353544 | 2/1990 |
| EP | 0950693 | 10/1999 |
| WO | WO-01/40383 | 6/2001 |

* cited by examiner

Primary Examiner—Shrive P. Beck
Assistant Examiner—Rebecca A. Blanton
(74) Attorney, Agent, or Firm—Dickstein, Shapiro, Morin & Oshinsky, LLP.

(57) ABSTRACT

A color effect material is composed of a plurality of encapsulated substrate platelets in which each platelet is encapsulated with a first layer which acts as a reflector to light directed thereon, a visibly transparent second organic layer encapsulating the first layer in which the second layer provides an optically variable reflection of light impinging thereon and a third layer encapsulating the second layer and being selectively transparent to light directed thereon.

16 Claims, 1 Drawing Sheet

HYBRID INORGANIC/ORGANIC COLOR EFFECT MATERIALS AND PRODUCTION THEREOF

BACKGROUND OF THE INVENTION

Optically variable pigments have been described in the patent literature since the 1960s. Hanke in U.S. Pat. No. 3,438,796 describes the pigment as being "thin, adherent, translucent, light transmitting films or layers of metallic aluminum, each separated by a thin, translucent film of silica, which are successively deposited under controlled conditions in controlled, selective thickness on central aluminum film or substrate." These materials are recognized as providing unique color travel and optical color effects.

The prior art approaches to optically variable pigments have generally adopted one of two techniques. In the first, a stack of layers is provided on a temporary substrate which is often a flexible web. The layers are generally made up of aluminum and $MgF_2$. The stack of film is separated from the substrate and subdivided through powder processing into appropriately dimensioned particles. The pigments are produced by physical techniques such as physical vapor deposition onto the substrate, separation from the substrate and subsequent comminution. In the pigments obtained in this way, the central layer and all other layers in the stack are not completely enclosed by the other layers. The layered structure is visible at the faces formed by the process of comminution.

In the other approach, a platelet shaped opaque metallic substrate is coated or encapsulated with successive layers of selectively absorbing metal oxides and non-selectively absorbing layers of carbon, metal and/or metal oxide. To obtain satisfactory materials using this approach, the layers are typically applied by chemical vapor deposition techniques in a fluidized bed. A major shortcoming of this technique is that fluidized bed processes are cumbersome and require substantial technical infrastructure for production. An additional limitation related to the substrates utilized is that traditional metal flakes usually have structural integrity problems, hydrogen outgassing problems and other pyrophoric concerns.

The prior art approaches suffer from additional disadvantages. For instance, certain metals or metal flake such as chromium and aluminum, specifically when they are used as outer layers may have perceived health and environmental impacts associated with their use. The minimization of their use in optical effect materials should be advantageous due to their perceived impact.

SUMMARY OF THE INVENTION

The present invention provides a color effect material comprising a platelet-shaped substrate encapsulated with (a) a first layer highly reflective to light directed thereon; (b) a visibly transparent second organic layer encapsulating the first layer and providing a variable pathlength for light dependent on the angle of incidence of light impinging thereon in accordance with Snell's Law; and (c). a selectively transparent third layer to light directed thereon.

Figure 1:
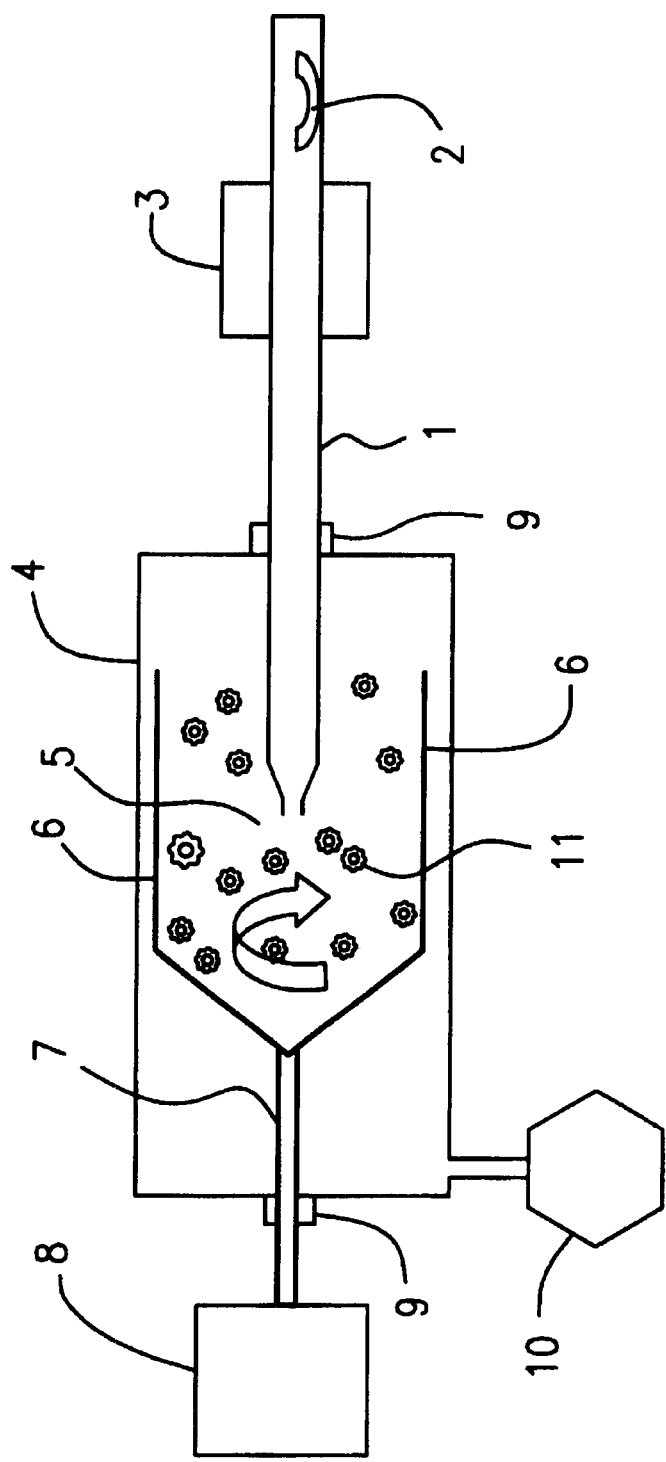
FIG. 1 represents a modified plow type mixer under vacuum and at elevated temperature. The reactor consists of refractory tube 1 containing a ceramic boat 2 filled with polymer precursor dichlorodipara-xylylene. The precursor is volatilized in the tube and enters the pyrolysis furnace 3 operating at a temperature greater than about 600° C. Under elevated temperature, the precursor is converted into a highly reactive monomeric vapor. The reactive monomer is transported to the main chamber of the evacuated mixer while being maintained at about 0.1 torr by vacuum pump 10. The reactive monomer enters the mixing chamber through the tapered ceramic tube 5 where it immediately comes in contact with particles 11 which are mechanically aerosolized by mixing blades 6. The mixing blades are driven by motor 8 having a shaft 7 extending into the mixer 4 through vacuum seal 9.

DESCRIPTION OF THE INVENTION

It is an object of the present invention to provide novel hybrid inorganic/organic color effect materials (HIO-CEMs) which can also be prepared in a reliable, reproducible and technically efficient manner. This object is achieved by a HIO-CEM comprising a platelet-shaped substrate coated with: (a) a first layer highly reflective to light directed thereon; and (b) a visibly transparent second organic layer encapsulating the first layer in which the second layer consists of a low index of refraction material, typically a refractive index from 1.3 to 2.5 and more specifically between 1.4 and 2.0, that provides a variable path length for light dependent on the angle of incidence of light impinging thereon; and (c) a selectively transparent third layer to light directed thereon.

The degree of reflectivity for the first encapsulating layer should be from 100% to 5% reflectivity, whereas the selective transparency of the third encapsulating layer should be from 5% to 95% transmission. More specifically, one would prefer to have 50–100% reflectivity and 50–95% transparency for the first and third encapsulating layers, respectively. The degree of reflectivity and transparency for different layers can be determined by a variety of methods such as ASTM method E1347-97, E1348-90 (1996) or F1252-89 (1996).

The substrate can be mica, aluminum oxide, bismuth oxychloride, boron nitride, glass flake, iron oxide-coated mica (ICM), silicon dioxide, titanium dioxide-coated mica (TCM), copper flake, zinc flake, alloy of copper flake, alloy of zinc flake, or any encapsulatable smooth platelet.

The first and third layers can be the same or different such as precious metals (i.e., silver, gold, platinum, palladium, rhodium, ruthenium, osmium and/or iridium or alloys thereof), copper, zinc, an alloy of copper or an alloy of zinc, silicon, titanium dioxide, iron oxide, chromium oxide, a mixed metal oxide, and aluminum. Of course, when the substrate is copper flake, zinc flake, alloy of copper flake or alloy of zinc flake, there is no need for such a first layer since it would be part of the substrate.

The second encapsulating layer can be any organic material such as polymer, for example and preferably para-xylylene polymers and polydivinylbenzene.

An advantage of the present invention is the wide variety of visibly transparent polymers that can be easily processed and economically employed. Of particular advantage is the use of para-xylylene polymers, the monomers of which can be produced in quantitative yields via thermal cleavage of cyclic dimmers without the production of gaseous by products. Additional advantages of these polymers would include their superior dimensional stability with respect to changes in relative humidity and unique optical, chemical and mechanical properties. The above advantages are imperative when being utilized as an optical encapsulation for controlling light and applications involving a variety of environments. Prior art has always focused on established, however limiting, inorganic materials. The historical view of polymer technology is their poor thermal and mechanical stability and thus were ignored prior to the present invention.

Another advantage of the present invention is that one does not have to start with a traditional particulate metal flake which may have structural integrity problems, hydrogen outgassing problems and a host of other perceived issues (pyrophoric and environmental concerns) typically associated with metal flakes. The precious metals when used in this invention are much more chemically stable than traditional particulate metal flakes such as aluminum and generally prefer to be in their non-oxidized metallic ground state. Furthermore, silver is preferred when employed as one of the reflecting layers, as it can maximize the chromaticity of the reflected color(s) of the HIO-CEM. In addition, when silver is used as the final (outer) layer of the particle, it imparts electrical conductivity to the HIO-CEM which may be desirable in some applications such as powder coatings. Advantages can also be realized when utilizing alloys as the first and/or third encapsulating layer. For instance, brass alloy when used in this invention is much more chemically stable than aluminum and is known to have long term weather stability. Brass is nearly chemically inert which allows great flexibility in the chemical systems employed in the manufacture of such effect materials and in their applications in end uses such as in paint, ink and polymer systems. Another advantage over the prior art is that brass when used as one of the reflecting layers in this invention, is a good reflector of white light and at the same time provides an attractive bulk color. The same would be true for an aluminum-copper alloy. Such an alloy is advantageous due to its attractive bulk color effect, while maintaining high reflectivity. Additionally, both brass and copper coated substrates provide the decorative/functional attributes of brass and copper, however under more environmentally favorable terms due to the reduced metal concentration since the HIO-CEMs of the present invention are not pure brass or copper, rather brass or copper coated inorganic substrates. In addition, one can produce the HIO-CEMs where the outer encapsulating layers are not made of brass, or other alloys.

A surprising aspect of the present invention is that cost effective composite materials are created with desirable optical effect and conductive properties.

Organic polymer layers can be deposited by aqueous polymerization/precipitation, solvent polymerization/deposition or chemical vapor deposition. For aqueous deposition, the polymer is deposited from aqueous monomers and initiators. For solvent deposition, the polymer is solubilized in an appropriate solvent and deposited on the substrate during solvent evaporation, or alternatively monomers added to the solvent would be initiated and polymerized on the surface of the coated substrate. For chemical vapor deposition, the polymer is deposited from gaseous monomers such as hexamethylene diisocyanate, toluene diisocyanate or isophorone diisocyanate and polymerized on the coated substrate surface with hexamethylene diamine or hydrazine. In addition, parylene can be directly deposited in the gas phase from the thermal cleavage of cyclic dimmers.

Inorganic metal layers are preferably deposited by electroless deposition and the non-metal layers preferably by sol-gel deposition. An advantage of electroless: deposition (Egypt. J. Anal. Chem., Vol. 3, 118–123 (1994)) is that it is a world wide established chemical technique, not requiring cumbersome and expensive infrastructure compared to other techniques. The electroless deposition technique also allows one to control the degree of reflectivity of light quite accurately and easily by varying the metal film thickness. Additionally, the known procedures are generalized procedures capable of being utilized for coating a variety of surfaces. Furthermore, an encapsulating layer of a metal or metal oxide can also be deposited onto any of the substrates by chemical vapor deposition from an appropriate precursor (The Chemistry of Metal CVD, edited by Toivo T. Kodas and Mark J. Hampden-Smith; VCH Verlagsgesellschaft GmbH, D-69451 Weinheim, 1994, ISBN 3-527-29071-0).

For deposition of alloys, a unique method has been developed as described in U.S. Pat. No. 4,940,523 which outlines a "process and apparatus for coating fine particles." In addition, the technique can be used to deposit pure metals such as chromium, platinum, gold and aluminum, or ceramics.

The products of the present invention are useful in automotive, cosmetic, industrial or any other application where metal flake, iridescent materials, pearlescent or absorption pigments are traditionally used.

The size of the platelet-shaped substrate is not critical per se and can be adapted to the particular use. In general, the particles have average largest major dimensions of about 5–250 $\mu$m, in particular 5–100 $\mu$m. Their specific free surface area (BET) is in general from 0.2 to 25 $m^2/g$. Of course similar size substrates can be made in which their surface area has been engineered to a much higher or lower value.

The HIO-CEMs of the invention are notable for multiple encapsulation of the platelet-shaped substrate.

The first metallic encapsulating layer is highly reflective to light directed thereon. The thickness of the first layer is not critical so long as it is sufficient to make the layer highly reflective. If desirable, the thickness of the first layer can be varied to allow for selective transmission of light. The thickness of the first metallic layer may be 5 nm to 500 nm and preferably 25 nm to 100 nm for copper, zinc, silver, aluminum or alloys thereof. A metallic layer thickness out of the above-mentioned ranges will typically be either completely opaque or allow for substantial transmission of light. In addition to its reflective properties, the metallic encapsulating layer may exhibit unique bulk color effects depending on the film thickness. For example, a brass coating thickness of >50 nm will begin to exhibit a metallic gold bulk color, while maintaining good reflectivity. The mass percent of the coating will be directly related to the surface area of the particulate substrate being utilized.

The second organic encapsulating layer must provide a variable pathlength for light dependent on the angle of incidence of light impinging thereon and therefore, any low index of refraction material that is visibly transparent may be utilized. Preferably, the second layer is selected from the group consisting of parylene, polytetrafluoroethylene, polyvinylacetate, polydivinylbenzene, ethylcellulose, polymethylmethacrylate, polyvinylalcohol, polyurethanes and polyureas. More preferably, the second layer is a parylene or polydivinylbenzene.

The thickness of the second layer varies depending on the degree of color travel desired. In addition, the second layer will have a variable thickness depending on a variety of factors, especially refractive index. Materials having a refractive index around 1.5 tend to require a film thickness of a few hundred nanometers for generation of unique color travel. For instance, a second layer has a preferable thickness of about 75 to 500 nm for parylene, polytetrafluoroethylene, polyvinylacetate, polydivinylbenzene, ethylcellulose, polymethylmethacrylate, polyvinylalcohol, polyurethanes and polyureas.

In one embodiment, the second layer is encapsulated by a selectively-transparent third layer that allows for partial reflection of light directed thereon. Preferably, the third encapsulating layer is selected from the group consisting of copper, silicon, titanium dioxide, iron oxide, chromium oxide, a mixed metal oxide, aluminum or alloys thereof. More preferably, the third encapsulating layer is one or more of the precious metals selected from the group consisting of silver, gold, platinum, palladium, rhodium, ruthenium, osmium and/or iridium or alloys thereof.

Of course, the third layer can also contribute to the interference color of the pigment. Its thickness can vary but must always allow for partial transparency. For instance, a third layer has a preferable thickness of about 5 to 45 nm for silicon; about 2 to 25 nm for aluminum; about 2 to 25 nm for copper; about 2 to 20 nm for zinc; about 1 to 25 nm for titanium nitride; about 10 to 60 nm for iron oxide; about 10 to 60 nm for chromium oxide; about 10 to 120 nm for titanium dioxide; about 5 to 100 nm for a mixed metal oxide, about 5 to 50 nm for silver; about 3 to 30 nm for gold; about 3 to 30 nm for platinum; and about 5 to 30 nm for palladium. The precious metal and base metal alloys generally have a similar film thickness requirement compared to the pure metal. It is recognized that a film thickness out of the above range may be applicable depending on the desired effect.

All the encapsulating layers of the CEM of the invention are altogether notable for a uniform, homogeneous, film-like structure that results from the manner of preparation according to the invention.

In the novel process for preparing the coated platelet-like substrates, the individual coating steps are each effected by sputter deposition, electroless deposition, complex coacervation, vapor deposition or hydrolysis/condensation of suitable starting compounds in the presence of the substrate particles to be coated. Alloys, such as brass, can be deposited by a sputtering technique as described in U.S. Pat. No. 4,940,523. In addition, pure metals such as aluminum, copper and zinc, as well as others, can be sputter deposited. Electroless deposition of metals is an established technique for coating particulate materials. For instance, metals can be deposited by electroless techniques from reduction of aqueous salts.of the metals, such as $HAuCl_4$, $AgNO_3$, $CuSO_4$, $H_2PtCl_6$, $PdCl_2$. Polymers such as parylene can readily be deposited in the vapor phase according to well established techniques. Detailed parylene chemistry, along with vapor deposition techniques, is taught to us in U.S. Pat. No. 3,342,754 by Gorham, this disclosure of which is hereby incorporated by reference. It is understood that one can control and vary the refractive index by the multitude of polymer structures prepared by the teachings of Gorham, as well as other polymer synthesis techniques. Titanium dioxide can be deposited from tetraalkoxides such as titanium tetraethoxide, halide compounds such.as titanium tetrachloride and sulfate compounds such as titanium sulfate, titanium nitride from titanium tetrachloride, tetrakis (diethylamido)titanium (TDEAT) and tetrakis (dimethylamido)titanium (TDMAT); iron oxide from iron carbonyl, iron sulfate and iron chloride; and chromium oxide from chromium carbonyl and chromium chloride.

In general, the synthesis of a hybrid inorganic/organic color effect material can be as follows: a platelet material such as mica is suspended while stirring in an aqueous medium. To the suspension is added a metal precursor capable of depositing metal on the substrate by electroless deposition, along with a suitable reducing agent. The highly reflective metal coated substrate is filtered, washed and dried. An aqueous deposition process can be employed for the deposition of an organic polymer on the metal coated mica or other substrate. The polymer is deposited from aqueous monomers and initiators. The organic material encapsulated metal coated platelet is filtered, washed and re-suspended in a stirred aqueous medium. To the aqueous medium is added a metal precursor capable of depositing metal on the substrate by electroless deposition, along with a suitable reducing agent. The metal solution for electroless deposition is added as described above allowing for the deposition of a selectively transparent metal coating. The final particulate product is washed, dried and exhibits optical color effects as a function of viewing angle.

Depending on the thickness of the low refractive index second encapsulating layer, the final HIO-CEM will display multiple different color effects as a function of viewing angle (red, orange, green, violet). The platelet substrate acts as a carrier substrate. It may, or may not, have a contribution or effect on the final optical properties of the particulate.

The hybrid inorganic/organic color effect materials (HIO-CEMs) of the invention are advantageous for many purposes, such as the coloring of paints, printing inks, plastics, glasses, ceramic products and decorative cosmetic preparations. Their special functional properties make them suitable for many other purposes. The CEMs, for example, could be used in electrically conductive or electromagnetically screening plastics, paints or coatings or in conductive polymers. The conductive functionality of the CEMs makes them of great utility for powder coating applications.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples would include polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburgh (1994), particularly pages 63–288. The foregoing references are hereby incorporated by reference herein for their teachings of ink, cosmetic, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic lattices, coalescing agents, water or solvents. The pigment may also be used, for example, at a level of 20 to 30% in a plastic color concentrate in polyethylene.

In the cosmetic field, these pigments can be used in the eye area and in all external and rinse-off applications. They are restricted only for the lip area. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

EXAMPLE 1

Procedure for evaluation of CEMs According to the Invention

The luster and color are evaluated using drawdowns on a hiding chart (Form 2-6 Opacity Charts of the Leneta Company) both visually and instrumentally. A drawdown on the black portion of the card displays the reflection color while the white portion displays the transmission color at non-specular angles.

The drawdowns are prepared by incorporating 3–12% HIO-CEM in a nitrocellulose lacquer, with the concentration dependent on the particle size distribution of the HIO-CEM. For example, a 3% drawdown would likely be used for an average HIO-CEM particle size of 20 $\mu$m while a 12% drawdown might be used for an average HIO-CEM particle size of 100 $\mu$m. The HIO-CEM-nitrocellulose suspension is applied to the drawdown card using a Bird film application bar with a wet film thickness of 3 mil.

When these drawdowns are observed visually, a variety of colors can be observed dependent on the viewing angle, such as, aqua to blue to violet. The degree of color travel observed is controlled by the thickness of the low index of refraction layer. Other quantifiable parameters commonly used to describe effect pigments, such as lightness (L*) and chromaticity (C*), can be controlled through both: a) the choice of materials used as lower reflecting and top, selectively transmitting encapsulating layers and b) the thickness of said lower and top encapsulating layers.

The drawdown is further characterized using a goniospectrophotometer (CMS-1500 from Hunter). The reflectivity vs. wavelength curve is obtained at various viewing angles. The color travel for the HIO-CEM is described using the CIELab L*a*b* system. The data is recorded both numerically and graphically. The numerical recording for a HIO-CEM representative of that obtained in Example 2 is as follows:

| Incident Angle | Approximate Silver Thickness 1st Encapsulating Layer (nm) | Approximate Polymer Thickness 2nd Encapsulating Layer (nm) | Approximate Silver Thickness 3rd Encapsulating Layer (nm) | L* | A* | B* |
|---|---|---|---|---|---|---|
| 0 | 50 | 250 | 4 | 70 | 48 | −30 |
| 10 | 50 | 250 | 4 | 71 | 48 | −28 |
| 20 | 50 | 250 | 4 | 73 | 45 | −22 |
| 30 | 50 | 250 | 4 | 76 | 37 | −10 |
| 40 | 50 | 250 | 4 | 80 | 24 | 7 |
| 50 | 50 | 250 | 4 | 84 | 10 | 27 |
| 60 | 50 | 250 | 4 | 88 | 1 | 36 |
| 70 | 50 | 250 | 4 | 90 | 0 | 27 |
| 0 | 50 | 75 | 4 | 73 | 4 | 37 |
| 0 | 50 | 100 | 4 | 53 | 50 | −51 |
| 0 | 50 | 125 | 4 | 78 | −47 | −21 |
| 0 | 50 | 150 | 4 | 96 | −9 | 14 |
| 0 | 50 | 175 | 4 | 95 | 2 | 24 |
| 0 | 50 | 200 | 4 | 91 | 0 | 41 |
| 0 | 50 | 225 | 4 | 84 | 11 | 30 |
| 0 | 50 | 250 | 4 | 70 | 48 | −30 |
| 0 | 50 | 275 | 4 | 68 | 26 | −36 |
| 0 | 50 | 300 | 4 | 79 | −46 | −11 |
| 0 | 50 | 325 | 4 | 90 | −43 | 23 |
| 0 | 50 | 350 | 4 | 93 | −10 | 44 |
| 0 | 50 | 400 | 4 | 83 | 34 | −2 |

The L*a*b* data characterizes the appearance of the sample. L* is the lightness/darkness component, a* describes the red/green color component, b* represents the blue/yellow component.

EXAMPLE 2

Preparation of Ag/Polydivinylbenzene/Ag CEM

Fifty grams of silver coated borosilicate flake is placed in a 1 liter oven dried morton flask containing 650 ml of mineral spirits (boiling point 179–210° C.) previously dried over anhydrous magnesium sulfate. A condenser containing drierite desiccant is fitted to one neck of the 3-neck morton flask with a stirring shaft and temperature probe fitted to the other two necks. The suspension is stirred at 250 rpm's and heated to 100° C. To the heated suspension is added 0.82 grams of benzoyl peroxide crystals followed by 7.4 grams (0.057 moles) of divinylbenzene (technical purity, 80% mixture of isomers). The reaction is allowed to stir at 100° C. for 18 hours and then cooled to 45° C. The entire suspension is then filtered on an 11 cm Buchner funnel using #2 Whatman filter paper, rinsed with ethanol and the product dried at 120° C. The calculated yield of the PDVB is 82% and calculated film thickness is 300 nanometers. The resulting PDVB coating is visibly transparent and does not decrease the high reflectivity of the silver coated borosilicate flake.

Ten grams of the above PDVB encapsulated silver coated flake is dispersed in 100 ml of distilled water in a 250 ml 3-neck flask. A stirring shaft, pH meter and temperature probe are fitted to the 3-neck flask. The suspension is stirred at 250 rpms. To the suspension is added a colloidal solution of 0.10 grams of tin chloride in 100 ml of distilled water. After 10 minutes of stirring, the suspension is filtered on an 11 cm Buchner funnel using #2 Whatman filter paper and rinsed with distilled water. The rinsed presscake is then transferred to a 250 ml 3-neck morton flask fitted with a stirring shaft, pH meter and temperature probe. A solution of 1.0 grams of dextrose in 75 ml of distilled water is added to the flask and stirred at 250 rpm's. Through the temperature probe port of the flask a solution of 1.0 grams silver nitrate in 100 ml of distilled water containing a molar excess of 2-amino-2-methyl propanol is added at 10 ml per minute.

After a few minutes, the slurry displays a brilliant greenish to gold color flop. The entire suspension is then filtered on an 11 cm Buchner funnel using #2 Whatman filter paper, rinsed with distilled water and the product dried at 120° C. In bulk powder form the product exhibits pronounced color effects based on viewing angle varying from green to gold to red interference effects.

EXAMPLE 3

Silver coated borosilicate particles are introduced into a modified plow type mixer as described in FIG. 1. The reactor consists of refractory tube 1 containing a ceramic boat 2 filled with polymer precursor dichloro-di-p-xylylene. The precursor is volatilized in the tube and enters the pyrolysis furnace 3 operating at a temperature of about 600° C. Under elevated temperature, the precursor is converted into a highly reactive monomeric vapor. Encapsulation and polymerization of the particulate material involves the pyrolysis cleavage of the methylene-methylene bonds in dichloro-di-p-xylylene resulting in two molecules of reactive monomer chloro-p-xylylene. The reactive monomer is transported to the main chamber of the evacuated mixer while being maintained at about 0.1 torr by vacuum pump 10. As the reactive monomer enters the aerosolized cloud of particles 11 through the tapered ceramic tube 5, it is adsorbed on the particle surfaces followed by instantaneous polymerization. Mechanical aerosolization of the powders is achieved by mixing blades 6 driven by motor 8 having a shaft 7 extending into the mixer 4 through vacuum seal 9. The resulting microencapsulated particles have a uniform optical quality coating of parylene. The powder is eventually removed from the reactor and the final silver coating is applied as in Example 2.

EXAMPLE 4

A HIO-CEM prepared according to example 2 is incorporated into polypropylene step chips at 1% concentration. The step chips are appropriately named since they have graduating thickness at each step across the face of the chip. The graduating steps allow one to examine the different effect of the HIO-CEM based on polymer thickness.

EXAMPLE 5

A HIO-CEM prepared according to example 2 is incorporated into a nail enamel. 10 g of the HIO-CEM is mixed with 82 g of suspending lacquer SLF-2, 4 g lacquer 127P and 4 g ethyl acetate. The suspending lacquer SLF-2 is a generic nail enamel consisting of butyl acetate, toluene, nitrocellulose, tosylamide/formaldehyde resin, isopropyl alcohol, dibutyl phthalate, ethyl acetate, camphor, n-butyl alcohol and silica.

EXAMPLE 6

A 10% by weight HIO-CEM from example 2 is sprayed in a polyester TGIC powder coating from Tiger Drylac using a PGI corona Gun #110347. The HIO-CEM is mixed in a clear polyester system and sprayed over a RAL 9005 black pigmented polyester powder. The HIO-CEM is highly attracted to the ground metal panel due to its electrical properties. Additionally, due to its high affinity to orient closely to the surface it produces a finish that is high in distinctness of image (DOI). It does not require an additional clear coat to reduce protrusion often caused by traditional pearlescent and metal flake pigments.

EXAMPLE 7

A 10% dispersion of the HIO-CEM prepared according to example 2 is mixed into a clear acrylic urethane basecoat clearcoat paint system DBX-689 (PPG) along with various PPG tints to achieve desired color. The tint pastes consist of organic or inorganic colorants dispersed at various concentrations in a solventborne system suitable with the DMD Deltron Automotive Refinish paint line from PPG. The complete formulation is sprayed using a conventional siphon feed spraygun onto 4×12" curved automotive type panels supplied by Graphic Metals. The panel is clear coated with PPG 2001 high solids polyurethane clear coat and air dried.

Various changes and modifications can be made in the process and products of the invention without departing from the spirit and scope thereof. The various embodiments disclosed herein were for the purpose of illustration only and were not intended to limit the invention.

What is claimed is:

1. A hybrid inorganic/organic color effect material comprising a platelet-shaped substrate encapsulated with:

(a) a first layer highly reflective to light directed thereon selected from the group consisting of an alloy of copper and zinc, an alloy of aluminum and copper, an alloy of aluminum and zinc, copper and zinc;

(b) a visibly transparent second organic layer encapsulating the first layer and providing a variable pathlength for light dependent on the angle of incidence of light impinging thereon; and (c) a selectively transparent third layer to light directed thereon.

2. The hybrid inorganic/organic color effect material of claim 1, wherein the substrate is selected from the group consisting of mica, aluminum oxide, bismuth oxychloride, boron nitride, glass flake, iron oxide-coated mica, iron oxide coated glass, silicon dioxide, titanium dioxide coated mica, titanium dioxide coated glass, copper flakes, zinc flakes, alloy of copper flakes, and alloy of zinc flakes.

3. The hybrid inorganic/organic color effect material of claim 1, wherein the first layer is an alloy of copper and zinc.

4. The hybrid inorganic/organic color effect material of claim 1, wherein the first layer is an alloy of aluminum and copper.

5. The hybrid inorganic/organic color effect material of claim 1, wherein the first layer is an alloy of aluminum and zinc.

6. The hybrid inorganic/organic color effect material of claim 1, wherein the first layer is copper.

7. The hybrid inorganic/organic color effect material of claim 1, wherein the first layer is zinc.

8. The hybrid inorganic/organic color effect material comprising a platelet-shaped substrate encapsulated with:

(a) a first layer highly reflective to light directed thereon selected from the group consisting of an alloy of copper and zinc, an alloy of aluminum and copper, an alloy of aluminum and zinc, copper and zinc;

(b) a visibly transparent second organic layer encapsulating the first layer and providing a variable pathlength for light dependent on the angle of incidence of light impinging thereon, the second encapsulating layer being an organic polymer; and (c) a selectively transparent third layer to light directed thereon.

9. The hybrid inorganic/organic color effect material of claim 8, wherein the second encapsulating layer is selected from the group consisting of parylene, polytetrafluoroethylene, polyvinylacetate, polydivinylbenzene, ethylcellulose, polymethylmethacrylate, polyvinylalcohol, polyurethanes and polyureas.

10. The hybrid inorganic/organic color effect material of claim 8, wherein the second encapsulating layer is polydivinylbenzene.

11. The hybrid inorganic/organic color effect material of claim 8, wherein the second encapsulating layer is parylene.

12. The hybrid inorganic/organic color effect material comprising a platelet-shaped substrate encapsulated with:
  (a) a first layer highly reflective to light directed thereon selected from the group consisting of an alloy of copper and zinc, an alloy of aluminum and copper, an alloy of aluminum and zinc, copper and zinc;
  (b) a visibly transparent second organic layer encapsulating the first layer and providing a variable pathlength for light dependent on the angle of incidence of light impinging thereon; and
  (c) a selectively transparent third layer to light directed thereon, wherein the second layer is an aqueous polymerization precipitation layer.

13. The hybrid inorganic/organic color effect material comprising a platelet-shaped substrate encapsulated with:
  (a) a first layer highly reflective to light directed thereon selected from the group consisting of an alloy of copper and zinc, an alloy of aluminum and copper, an alloy of aluminum and zinc, copper and zinc;
  (b) a visibly transparent second organic layer encapsulating the first layer and providing a variable pathlength for light dependent on the angle of incidence of light impinging thereon; and
  (c) a selectively transparent third layer to light directed thereon, wherein the second layer is a solvent polymerization deposition layer.

14. The hybrid inorganic/organic color effect material comprising a platelet-shaped substrate encapsulated with:
  (a) a first layer highly reflective to light directed thereon selected from the group consisting of an alloy of copper and zinc, an alloy of aluminum and copper, an alloy of aluminum and zinc, copper and zinc;
  (b) a visibly transparent second organic layer encapsulating the first layer and providing a variable pathlength for light dependent on the angle of incidence of light impinging thereon; and
  (c) a selectively transparent third layer to light directed thereon, wherein the second layer is a chemical vapor deposition layer.

15. The hybrid inorganic/organic color effect material of claim 10, wherein the substrate is platelet-shaped glass flake, the highly reflective first encapsulating layer is silver, the second encapsulating layer is polydivinylbenzene and the third encapsulating layer is a selectively transparent layer of silver.

16. The hybrid inorganic/organic color effect material of claim 10, wherein the substrate is platelet-shaped glass flake, the highly reflective first encapsulating layer is silver, the second encapsulating layer is parylene and the third encapsulating layer is a selectively transparent layer of silver.

* * * * *